(12) United States Patent
Penrod et al.

(10) Patent No.: US 9,541,108 B1
(45) Date of Patent: Jan. 10, 2017

(54) ANCHOR SYSTEM FOR SECURING ATTACHMENTS TO HANDLES

(71) Applicant: Julie Beth Penrod, Allen, TX (US)

(72) Inventors: Julie Beth Penrod, Allen, TX (US); Daniel Tagtow, Austin, TX (US)

( * ) Notice: Subject to any disclaimer, the term of this patent is extended or adjusted under 35 U.S.C. 154(b) by 0 days.

(21) Appl. No.: 14/549,136

(22) Filed: Nov. 20, 2014

Related U.S. Application Data

(60) Provisional application No. 61/907,261, filed on Nov. 21, 2013.

(51) Int. Cl.
*F16B 2/10* (2006.01)
*B62B 3/14* (2006.01)

(52) U.S. Cl.
CPC ............. *F16B 2/10* (2013.01); *B62B 3/1468* (2013.01); *B62B 2203/44* (2013.01)

(58) Field of Classification Search
CPC ....... F16B 2/10; B62B 3/1468; B62B 2203/44
USPC ........ 248/230.5, 229.23, 230.4, 231.51, 74.3
See application file for complete search history.

(56) References Cited

U.S. PATENT DOCUMENTS

| | | | | |
|---|---|---|---|---|
| 3,537,150 A | * | 11/1970 | Emberson | F16B 2/10 24/324 |
| 5,305,978 A | * | 4/1994 | Current | F16L 3/1075 248/230.4 |
| 5,359,866 A | * | 11/1994 | Boddy | F16B 2/10 24/270 |
| 6,135,398 A | * | 10/2000 | Quesnel | H02G 7/053 248/74.1 |
| 6,450,465 B1 | * | 9/2002 | Eslick | F16B 2/10 248/230.4 |
| 6,561,471 B1 | * | 5/2003 | Hawie | A01K 97/10 211/60.1 |
| 6,892,990 B2 | * | 5/2005 | Pisczak | H02G 7/053 248/62 |
| 7,614,593 B2 | * | 11/2009 | McClure | E21B 17/1035 248/229.14 |
| 8,408,507 B2 | * | 4/2013 | Liu | F16B 2/10 24/499 |
| 2007/0044281 A1 | * | 3/2007 | Witzel | A47J 37/0786 24/455 |

OTHER PUBLICATIONS

"Ontray2go" website, Internet website, Copyright 2007, available at www.ontray2go.com (last visited Mar. 24, 2016).

* cited by examiner

*Primary Examiner* — Anita M King

(57) ABSTRACT

The present invention is an apparatus for installing attachments on handles. The invention includes first and second pieces with curved sections that form a generally cylindrical volume around the handle. The first and second pieces are rotatably connected about a hinge axis and may be moved to and from a locked position around handle. A flap having a toothed surface is connected to an end of the second piece, and a tooth extending from an end of the first piece can engage the toothed surface to inhibit inadvertent release of the apparatus from the handle.

15 Claims, 9 Drawing Sheets

ANCHOR SYSTEM FOR SECURING ATTACHMENTS TO HANDLES

CROSS REFERENCES TO RELATED APPLICATIONS

This original non-provisional application claims priority to and the benefit of U.S. provisional application Ser. No. 61/907,261, filed Nov. 21, 2013, which is incorporated by reference.

FEDERALLY-SPONSORED RESEARCH

Not applicable.

BACKGROUND

1. Field of the Invention

The present invention relates to article carriers. More specifically, the invention is an anchor for securing an attachment to a horizontally-oriented handle, such as the handle of a shopping cart.

2. Description of the Related Art

It is common to have experienced the unfortunate incident of losing small items while shopping. These items usually end up on the floor of the store where they may be stepped on, damaged or permanently lost. And even if the small item is not lost, the shopper must deal with keeping track of the items, resulting in an inconvenience for the shopper.

BRIEF SUMMARY

The present invention is an apparatus for installing attachments on handles, which attachments may be used for carrying small articles while shopping. The invention includes first and second pieces with curved sections that form a generally cylindrical volume around the handle. The first and second pieces are rotatably connected about a hinge axis and may be moved to and from a locked position. A flap having a toothed surface is connected to an end of the second piece, and a tooth extending from an end of the first piece can engage the toothed surface to inhibit inadvertent release of the anchor from the handle.

DETAILED DESCRIPTION OF CERTAIN EMBODIMENT

Figure 1:
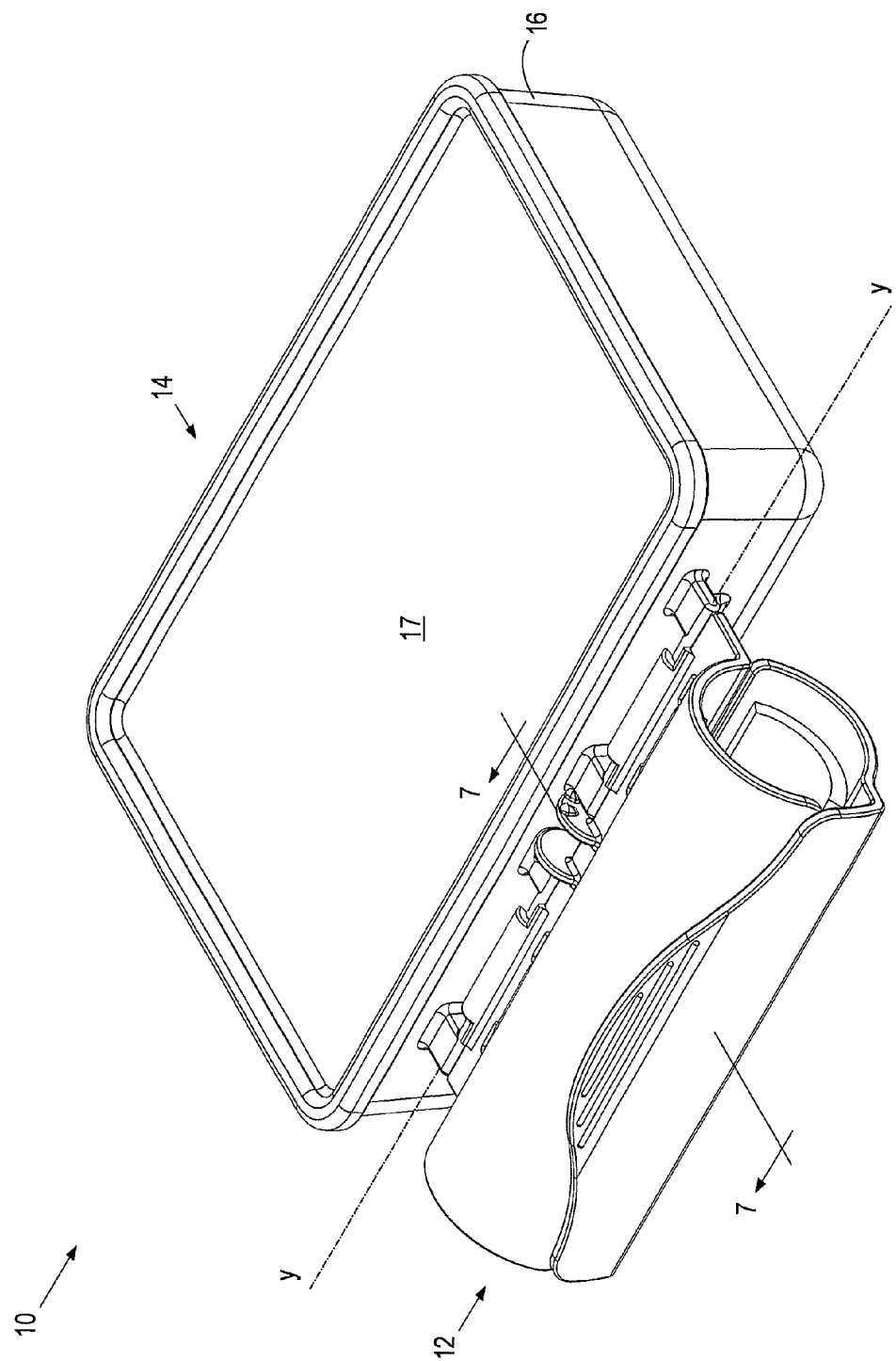
FIG. 1 is an isometric view of an embodiment of the invention having an anchor and an attachment.

FIG. 1 shows an anchor system 10 for installing attachments on shopping cart handles of various sizes. The system comprises an anchor 12 attached to an attachment 14, such as a tray 16 with a lid 17. Other types of attachments are contemplated, such as, but not limited to, holders or cases for various electronic devices (e.g., smartphones, tablets, personal digital assistants, etc.), a list holder, a writing instrument attachment, other types of containers, and ice packs.

Figure 2:
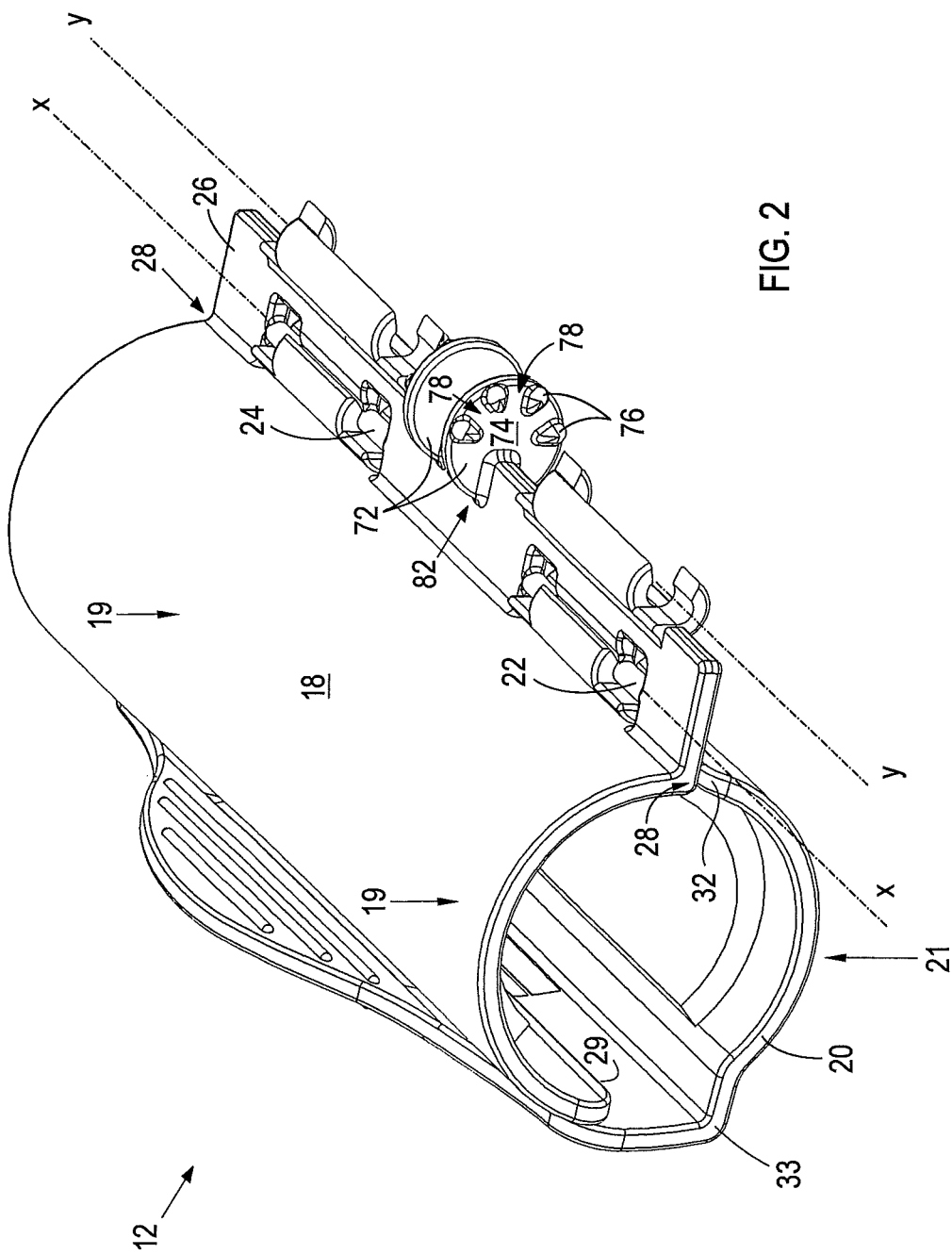
FIG. 2 is a reverse view of the anchor of the embodiment shown in FIG. 1.

Referring to FIG. 2, the anchor 12 has a top piece 18 and a bottom piece 20 hinged together about a hinge axis x. The top piece 18 includes a generally semi-cylindrical curved section 19 having ends 28, 29. The bottom piece 20 includes a generally semi-cylindrical curved section 21 having ends 32, 33.

Figure 3:
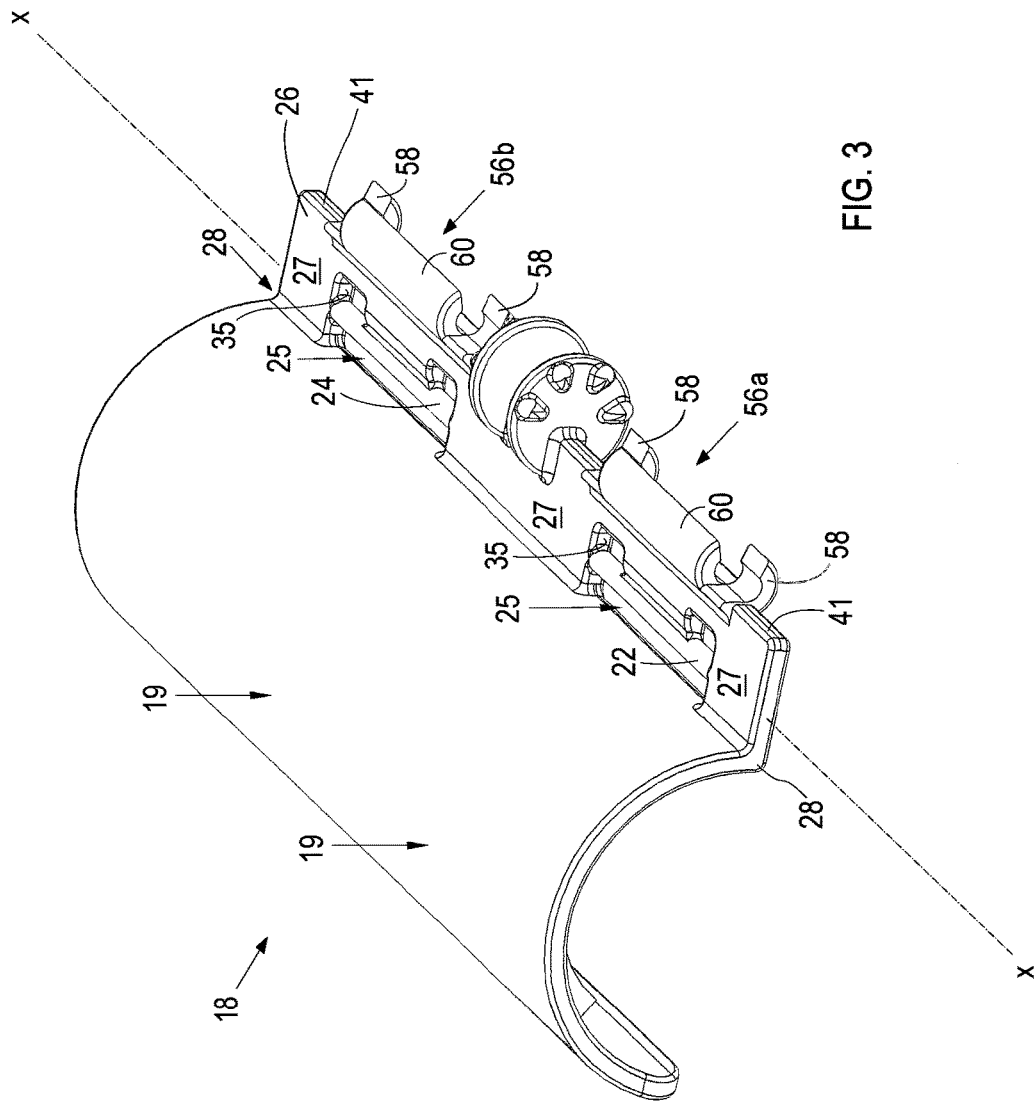
FIG. 3 is a top isometric view of the top piece of the anchor shown in FIG. 2
Figure 4:
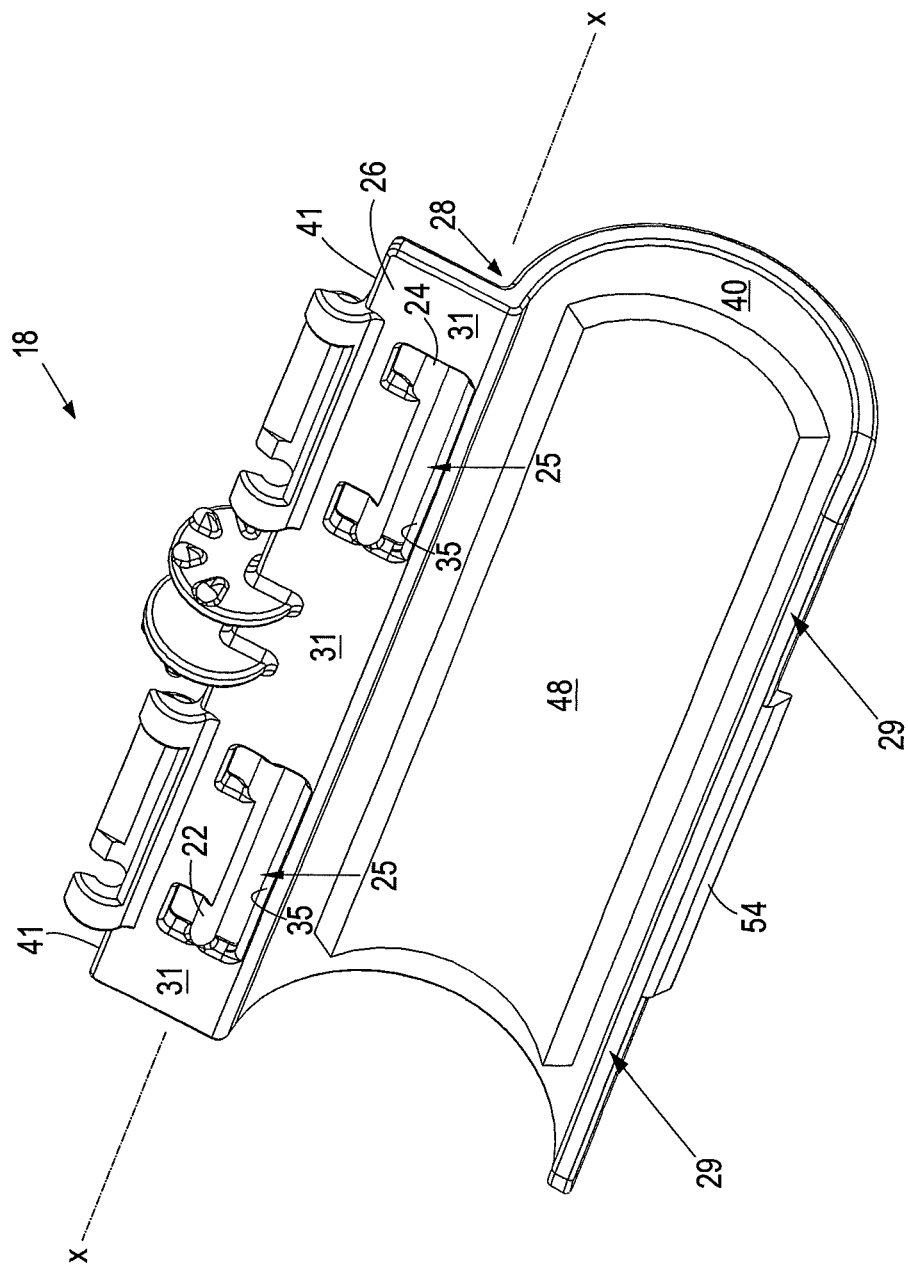
FIG. 4 is a bottom isometric view of the top piece of the anchor of the embodiment.

Referring to FIG. 3-4, the hinge axis x may be formed by a first bar 22 and a second bar 24 within openings 25 through a projection 26. The projection 26 is connected to the end 28 of the curved section 19 and has a free end 41 opposite of its connection to the curved section 19. The projection 26 has a first planar surface 27, a second planar surface 31 and surfaces 35 extending between the planar surfaces to define the openings 25. Cylindrical bars 22, 24 are within the openings 25 of the projection 26 and are collinear with each other and connect with elements on the bottom piece 20. Referring specifically to FIG. 4, the top piece 18 has a concave interior surface 40 and a pawl-like end 54 at end 29.

Figure 5:
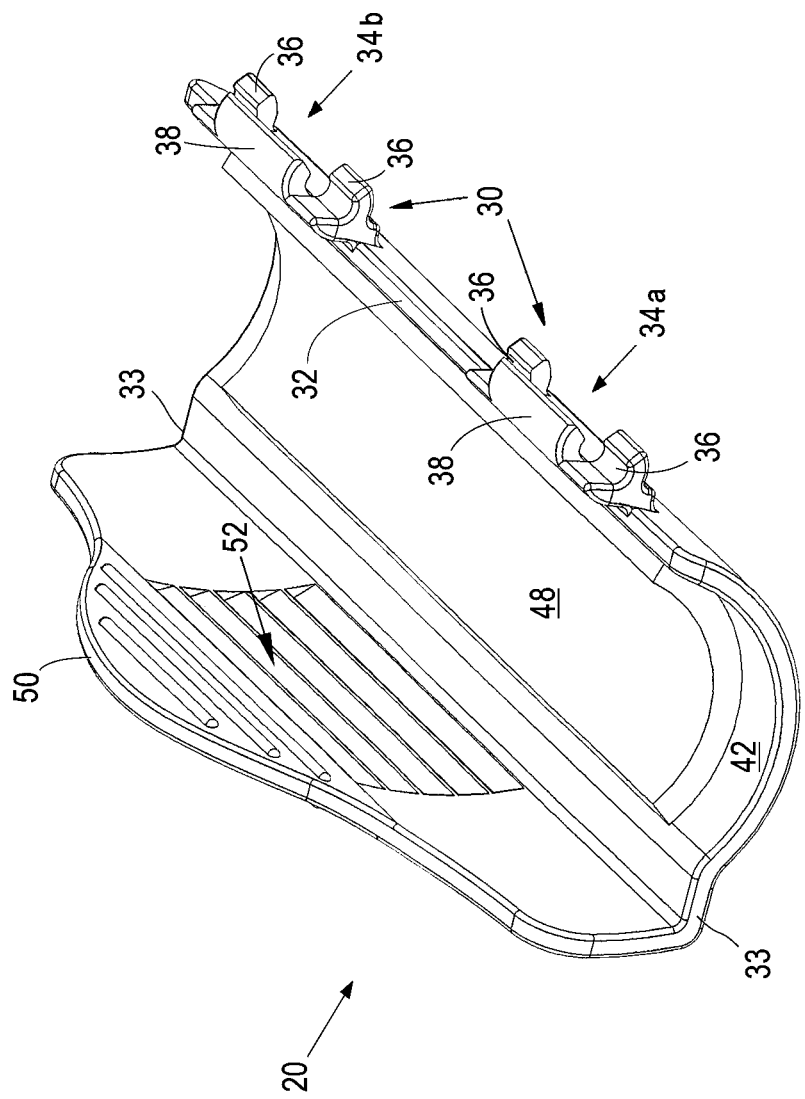
FIG. 5 is top isometric view of the bottom piece of the anchor.

Referring to FIG. 5, the bottom piece 20 has one or more projections 30 along the end 32, with each projection 30 containing a set 34a, 34b of hooked members. Preferably, each set 34a, 34b of hooked members comprises two members 36 having an upwardly facing arced surface and one member 38 having a downwardly facing arced surface. The bottom piece 20 has a concave interior surface 42. Each bar 22, 24 of the top piece 18 (see FIG. 3) snaps into a corresponding set 34a, 34b of hooked members on the bottom piece 20 between the upwardly and downwardly facing arced surfaces of members 36, 38. A flap 50 extends from the bottom piece 20 and has a toothed surface 52.

Figure 6:
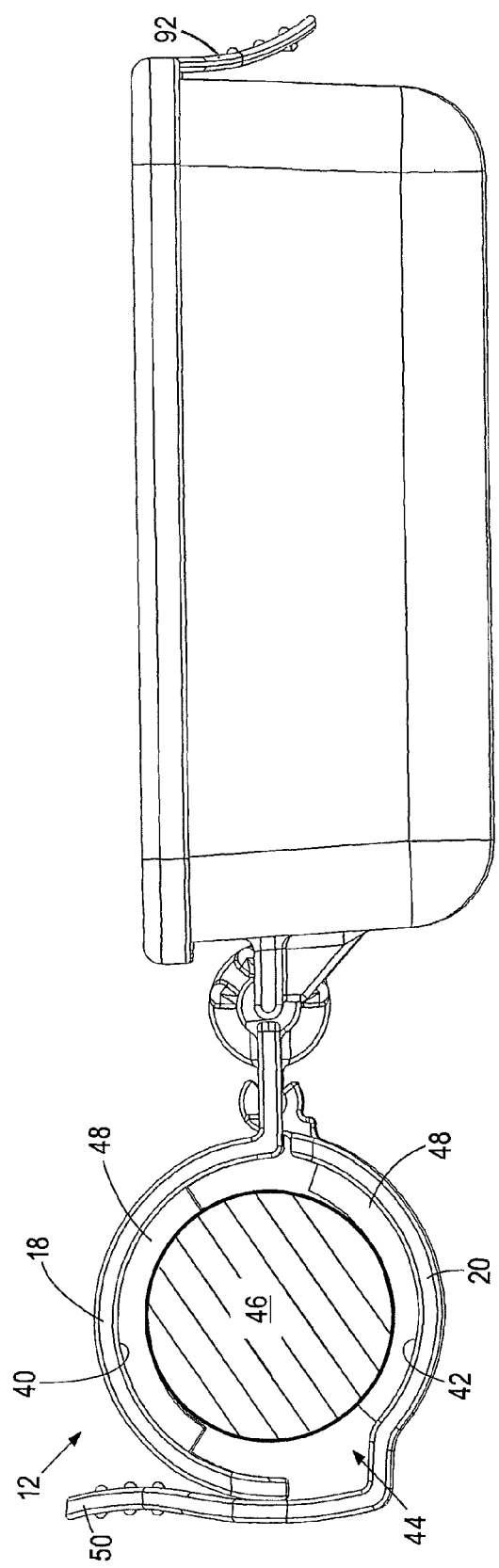
FIG. 6 is a side elevation of the first embodiment in a locked position.

Referring to FIG. 6, the concave interior surfaces 40, 42 together form a generally cylindrical interior 44 within which at least a portion of a shopping cart handle 46 may be contained. From an unlocked position with the top and bottom pieces 18, 20 of the anchor 12 loosely around the shopping cart handle 46, the top and bottom pieces 18, 20 are converged toward each other until they are in a locked position. In the locked position, the interior surfaces 40, 42 of the top and bottom pieces 18, 20 press against the portion of the shopping cart handle 46 that is within the interior 44 of the anchor 12. Preferably, each of the interior surfaces 40, 42 has a grip insert 48 affixed thereto to improve the "grip" of the interior surfaces 40, 42 on the shopping cart handle 46 so as to prevent slippage. Grip inserts 48 may be made of foam rubber or some other material with a greater coefficient of friction than the interior surfaces 40, 42.

The top and bottom pieces 18, 20 of the anchor 12 are held in the locked position by a locking means between the two items. Although other locking means are contemplated, preferably, the locking means is a ratchet-type mechanism. In this regard, the flap 50 extends over the top piece 18 such that the toothed surface 52 (see FIG. 5) is engaged by the pawl-like end 54 of the top piece 18 (see FIG. 4). As the top and bottom pieces 18, 20 converge around the shopping cart handle 46, the toothed surface 52 of the flap 50 and the pawl-like end 54 of the top piece 18 are displaced over each other, with the pawl-like end 54 progressively engaged with each tooth in the toothed surface 52 until the locked position is reached, as shown in the cross-section view of anchor 12 in FIG. 7.

The anchor 12 is configured for attaching a product line of various attachments. In this regard, the projection 26 on the top piece 18 of the anchor 12 has one or more sets 56a, 56b of hooked members radially outward of the first and second bars 22, 24, as shown in FIG. 3. Preferably, there are two sets 56a, 56b of hooked members, with each set comprising two members 58 having an upwardly facing arced surface and one member 60 having a downwardly facing arced surface.

Figure 8:
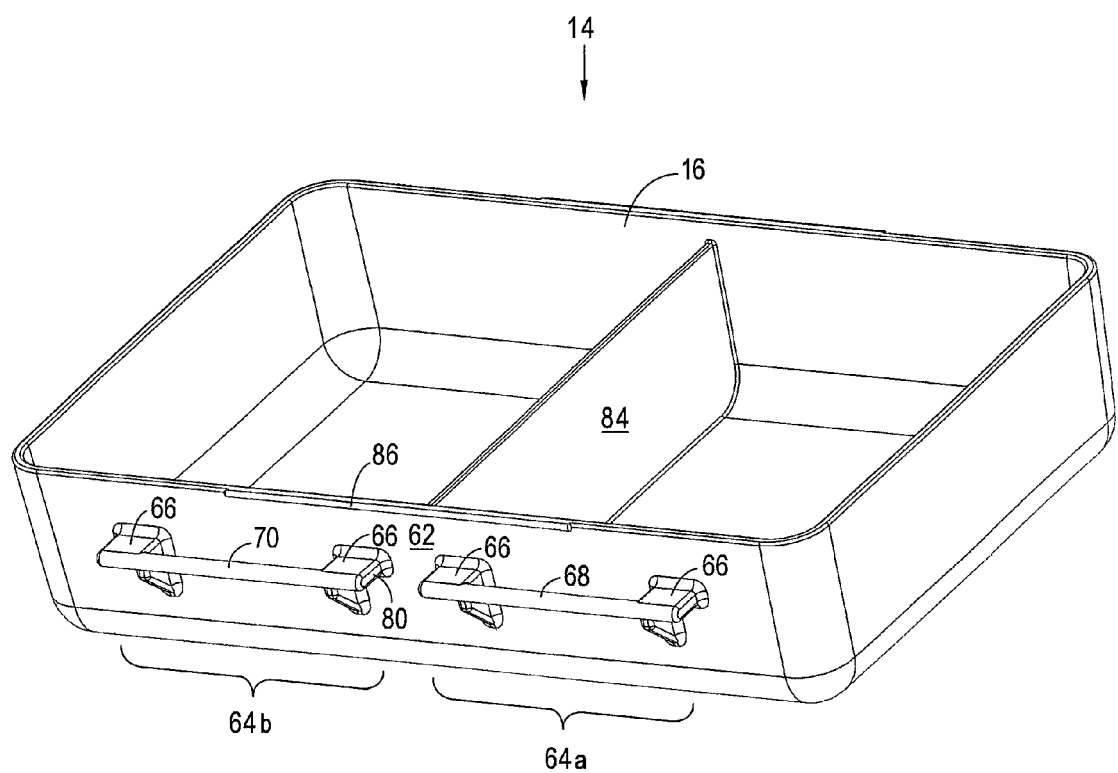
FIG. 8 is a top isometric view of the tray of the attachment of the embodiment.

Referring to FIG. 8, each attachment 14 has an outer surface 62 with two pairs 64a, 64b of protrusions 66 extending outwardly therefrom. The first pair of protrusions 64a has a first bar 68 extending between its two protrusions 66 and the second pair of protrusions 64b has a second bar 70 extending between its two protrusions 66. The first and second bars 68, 70 are collinear with each other and each fits between the upwardly and downwardly facing arced surfaces of members 58, 60 in the sets 56a, 56b of hooked members on the projection 26 on the top piece 18 of the anchor 12 (see FIG. 3). In this regard, the first bar 68 can be inserted within the first set 56a of hooked members and the second bar 70 can be inserted within the second set 56b of hooked members. Once the two bars 68, 70 are inserted within their corresponding set 56a, 56b of hooked members, the hinge axis y is formed between the anchor 12 and the attachment 14.

Referring back to FIG. 2, one or more rotation preventers 72 are within the hinge axis y to discourage rotation between the anchor 12 and the attachment 14 (not shown). Preferably, each rotation preventer 72 is in the shape of a disc; however, other shapes are contemplated. Each rotation preventer 72 has a surface 74 generally transverse to the hinge axis y and a plurality of nodules 76 in an arced path extends along the surface 74. Between each pair of consecutive nodules 74 in the arced path is a valley 78 shaped to receive a side portion 80 (see FIGS. 8-9) of one of the protrusions 66 from the outer surface 62 of the attachment 14. In this regard, the side portion 80 of the protrusion 66 fits at least partially within the valley 78 between consecutive nodules 76.

The rotation preventer 72 may be implemented in a notch 82 within the projection 26 on the anchor 12, as shown in FIG. 2, or alternatively may be implemented into the attachment 14. Concerning the latter, the rotation preventer 72 could be located along the side portion 80 of the protrusion 66, with the nodules 76 engaging a side portion of the projection 26 (not shown). Such would be the case, for example, if the rotation preventers 72 shown in FIG. 2 were installed on the pairs 64a, 64b of attachment protrusions 66 (see FIG. 8) and nodules 76 engaged a surface of the projection 26 within the notch 82.

As noted, the rotation preventers 72 discourage rotation between the anchor 12 and the attachment 14 about hinge axis y. The nodules 76 on the surface 74 of the rotation preventer 72 are sized such that when the appropriate amount of rotational force is applied about hinge axis y, the applicable side portion 80 of the protrusions 66 on the attachment 14 can slide over them. In contrast, when minimal force is applied the side portion 80 will rest between the nodules 76.

In order to minimize the rotational force about hinge axis y, the attachment 14 may be rested on the shopping cart. In this regard, the distance between the shopping cart handle 46 and the rest point for the attachment 14 may vary according to the type of shopping cart being used. Additionally, the elevation of the shopping cart handle 46 with respect to the rest point of the attachment 14 may also vary, with some shopping cart handles being higher than the rest point and others being lower than the rest point. Rotation of the anchor 12 with respect to the attachment 14 about hinge axis y allows the device to be adjusted to a suitable angle so that it can account for these variances.

Figure 7:
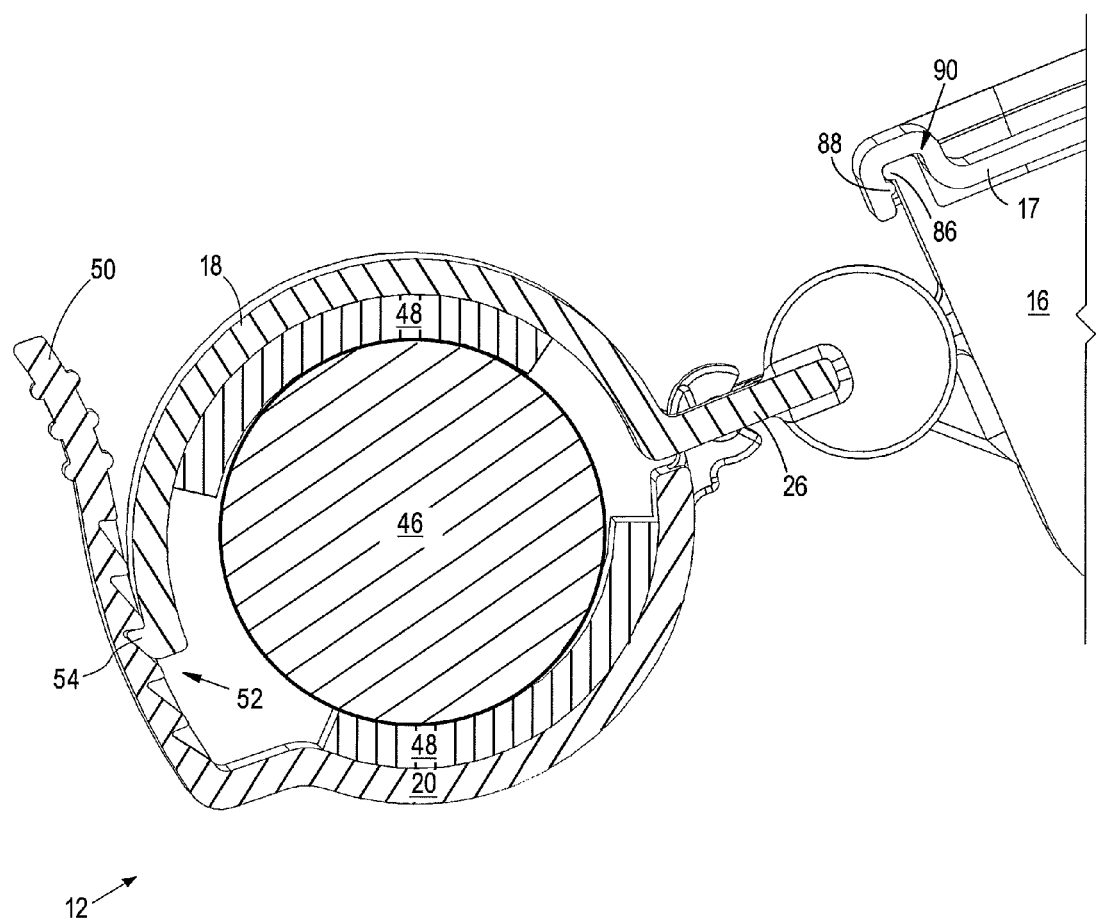
FIG. 7 is a side sectional view of the first embodiment through plane 7-7 of FIG. 1.
Figure 9:
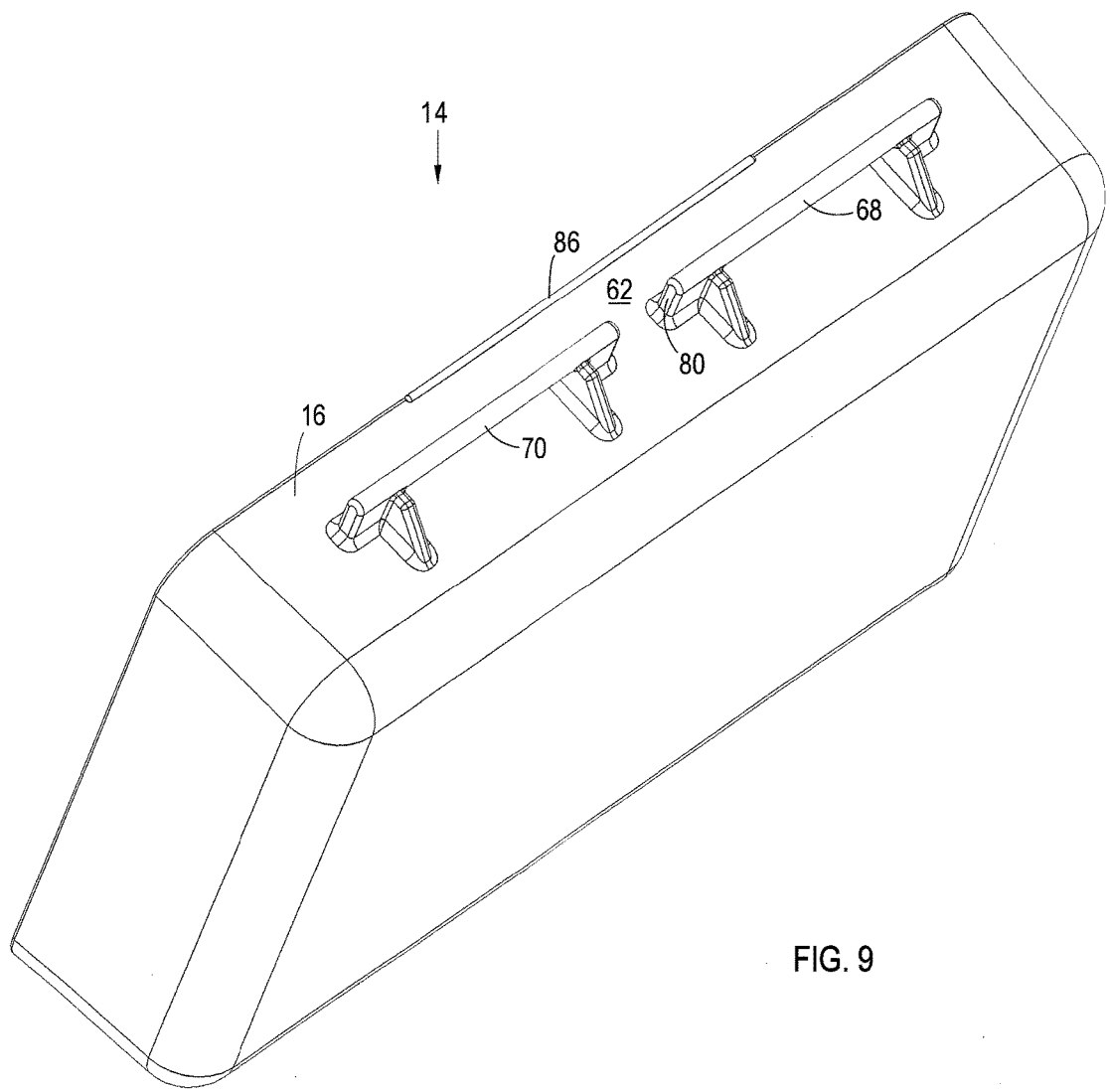
FIG. 9 is a bottom isometric view of the tray shown in FIG. 8.

Referring to FIGS. 8-9, a divider 84 separates the interior of the tray 16 into two compartments. The divider 84 may be in a different position in alternative embodiments or may not be present at all. At least one of the upper edges of the tray 16 has a lip 86 which interfaces with the lid 17. As shown in FIG. 7, the lip 86 engages with a corresponding lip 88 in the lid 17 along the upper edge of the tray 16. The corresponding lip 88 is within a recessed space 90 in the lid 17. Recessed space 90 extends around the perimeter of the lid 17 for secure closure of the lid 17 on the tray 16. Once the lip 86 and corresponding lip 88 are engaged, the lid 17 may be pulled closed with the flap 92 shown in FIG. 6. In this regard, a similar engagement of lips between the upper edge of the tray 16 and the lid 17 occurs on the side of the tray 16 where the flap 92 is located.

The device described herein may be constructed from a wide range of materials. For example, material options such as plastic or silicone are possible, along with other material. The grip insert as of right now is a type of foam but may be any material that would provide a grip, such as a gel-based, sticky gel, rubber, or non-slip material.

The invention described herein with reference to the accompanying drawings describes a specific embodiment. The present invention may be embodied in many different forms and should not be construed as limited to the embodiment set forth herein.

The invention claimed is:

1. An apparatus for installing attachments on handles, the apparatus comprising:
    a first piece having a first curved section with a first end, a second end, and a first concave surface between the first end and the second end, the first piece further having a projection adjacent to and extending away from the first end, the projection having a free end, a first surface, a second surface, and at least one surface extending between the first surface and the second surface and defining at least one opening between the first surface and the second surface;
    a first hinge axis intersecting the projection;
    a second hinge axis parallel to the first hinge axis, the free end of the projection being between the first hinge axis and the second hinge axis;
    at least one bar within the at least one opening, the at least one bar having a longitudinal axis collinear with the first hinge axis;
    a second piece having a second curved section with a first end, a second end, and a second concave surface between the first end and the second end, the second piece rotatably connected to the first piece at the first hinge axis, and
    wherein the first piece comprises at least one set of first hooked members proximal to the free end of the projection, each set of first hooked members having at least one first arced surface facing a first direction and at least one second arced surface facing a second direction, each of the first arced surface and the second arced surface at least partially circumscribing the second hinge axis.

2. The apparatus of claim 1 further comprising a reference plane parallel to and intersecting the first hinge axis and the second hinge axis, the reference plane intersecting the first concave surface.

3. The apparatus of claim 1 further comprising an attachment having a side portion, at least one protrusion extending from the side portion, and at least one attachment bar attached to the at least one protrusion, the at least one attachment bar having a longitudinal axis collinear with the second hinge axis.

4. The apparatus of claim 1 wherein the second piece comprises at least one set of second hooked members proximal to the second end of the second piece and partially occupying the at least one opening of the first piece, said at least one set of second hooked members having at least one first arced surface facing a first direction and at least one second arced surface facing a second direction, each of the first arced surface and second arced surface at least partially circumscribing the first hinge axis.

5. The apparatus of claim 1 further comprising at least one rotation preventer attached to the projection, the rotation preventer having a surface intersecting the second hinge axis and a plurality of nodules extending from the surface.

6. The apparatus of claim 5 wherein the at least one rotation preventer contacts the projection.

7. The apparatus of claim 1 further comprising at least one grip insert attached to each concave surface.

8. The apparatus of claim 1 wherein the first concave surface and the second concave surface partially define a handle volume having open ends.

9. The apparatus of claim 1 further comprising a flap connected to the second end of the second piece, the flap having a toothed surface.

10. The apparatus of claim 9 further comprising a tooth extending radially from the first curved section.

11. The apparatus of claim 10 further comprising the tooth in contact with the toothed surface.

12. The apparatus of claim 1 further comprising locking means for holding the first piece and the second piece in a locked position.

13. An apparatus for installing attachments on handles, the apparatus comprising:
    a first piece having a first curved section with a first end, a second end, and a first concave surface between the first end and the second end, the first piece further having a projection adjacent to and extending away from the first end, the projection having a free end, a first surface, a second surface, and at least one surface extending between the first surface and the second surface and defining at least one opening between the first surface and the second surface;
    a first hinge axis intersecting the projection;
    a second hinge axis parallel to the first hinge axis, the free end of the projection being between the first hinge axis and the second hinge axis;
    at least one bar within the at least one opening, the at least one bar having a longitudinal axis collinear with the first hinge axis;
    a second piece having a second curved section with a first end, a second end, and a second concave surface between the first end and the second end, the second piece rotatably connected to the first piece at the first hinge axis; and
    at least one rotation preventer attached to the projection, the rotation preventer having a surface intersecting the second hinge axis and a plurality of nodules extending from the surface.

14. An apparatus for installing attachments on handles, the apparatus comprising:
    a first piece having a first curved section with a first end, a second end, and a first concave surface between the first end and the second end, the first piece further having a projection adjacent to and extending away from the first end, the projection having a free end, a first surface, a second surface, and at least one surface extending between the first surface and the second surface and defining at least one opening between the first surface and the second surface;
    a first hinge axis intersecting the projection;
    a second hinge axis parallel to the first hinge axis, the free end of the projection being between the first hinge axis and the second hinge axis;
    at least one bar within the at least one opening, the at least one bar having a longitudinal axis collinear with the first hinge axis;
    a second piece having a second curved section with a first end, a second end, and a second concave surface between the first end and the second end, the second piece rotatably connected to the first piece at the first hinge axis; and
    at least one grip insert attached to each concave surface.

15. An apparatus for installing attachments on handles, the apparatus comprising:
    a first piece having a first curved section with a first end, a second end, and a first concave surface between the first end and the second end, the first piece further having a projection adjacent to and extending away from the first end, the projection having a free end, a first surface, a second surface, and at least one surface extending between the first surface and the second surface and defining at least one opening between the first surface and the second surface;
    a first hinge axis intersecting the projection;
    a second hinge axis parallel to the first hinge axis, the free end of the projection being between the first hinge axis and the second hinge axis;
    at least one bar within the at least one opening, the at least one bar having a longitudinal axis collinear with the first hinge axis;
    a second piece having a second curved section with a first end, a second end, and a second concave surface between the first end and the second end, the second piece rotatably connected to the first piece at the first hinge axis; and
    a flap connected to the second end of the second piece, the flap having a toothed surface.

* * * * *